United States Patent
Jun et al.

(10) Patent No.: US 10,960,760 B2
(45) Date of Patent: *Mar. 30, 2021

(54) VEHICLE CONTROL DEVICE MOUNTED IN VEHICLE AND CONTROL METHOD THEREOF

(71) Applicant: LG ELECTRONICS INC., Seoul (KR)

(72) Inventors: Honggul Jun, Seoul (KR); Sujin Kim, Seoul (KR); Kihyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

This patent is subject to a terminal disclaimer.

(21) Appl. No.: 16/361,134

(22) Filed: Mar. 21, 2019

(65) Prior Publication Data
US 2019/0217705 A1    Jul. 18, 2019

Related U.S. Application Data

(63) Continuation of application No. 15/448,141, filed on Mar. 2, 2017, now Pat. No. 10,286,783.
(Continued)

(30) Foreign Application Priority Data

Jan. 26, 2017    (KR) .................... 10-2017-0012738

(51) Int. Cl.
*B60K 35/00*    (2006.01)
*G01C 21/36*    (2006.01)
(Continued)

(52) U.S. Cl.
CPC ............... *B60K 35/00* (2013.01); *B60R 1/00* (2013.01); *G01C 21/36* (2013.01); *G01C 21/365* (2013.01);
(Continued)

(58) Field of Classification Search
CPC ........................................... G06T 11/60
See application file for complete search history.

(56) References Cited

U.S. PATENT DOCUMENTS

| | | | |
|---|---|---|---|
| 6,754,759 B1 * | 6/2004 | Cook .................. | G06F 13/4027 710/305 |
| 10,262,309 B1 * | 4/2019 | Chan ................... | G06Q 20/123 |

(Continued)

FOREIGN PATENT DOCUMENTS

| | | |
|---|---|---|
| GB | 2534151 | 7/2016 |
| JP | 3985300 | 10/2007 |

(Continued)

OTHER PUBLICATIONS

Korean Intellectual Property Office Application No. 10-2017-0012738, Notice of Allowance dated Oct. 1, 2018, 2 pages.
(Continued)

*Primary Examiner* — Phi Hoang
(74) *Attorney, Agent, or Firm* — Lee Hong Degerman Kang & Waimey

(57) ABSTRACT

Provided are a vehicle control device capable of displaying a high quality seamless image without data transmission delay and a difference in image quality between a plurality of displays, and a method thereof. The vehicle control device includes a plurality of different displays installed in a vehicle and a controller generating a first image having a plurality of pieces of first information, generating a second image having a plurality of pieces of second information, merging the first and second images, dividing the merged image into a plurality of images, and displaying the plurality of divided images on a plurality of displays, respectively.

20 Claims, 14 Drawing Sheets

Related U.S. Application Data

(60) Provisional application No. 62/304,900, filed on Mar. 7, 2016.

(51) Int. Cl.

| | | |
|---|---|---|
| *G06F 3/14* | (2006.01) | |
| *H04N 5/247* | (2006.01) | |
| *H04N 5/232* | (2006.01) | |
| *B60R 1/00* | (2006.01) | |
| *G06F 3/01* | (2006.01) | |
| *G06F 3/147* | (2006.01) | |
| *G06T 11/60* | (2006.01) | |
| *H04N 7/18* | (2006.01) | |
| *G09G 5/14* | (2006.01) | |
| *G06F 3/0482* | (2013.01) | |
| *G06F 3/0488* | (2013.01) | |

(52) U.S. Cl.
CPC ..... *G01C 21/3679* (2013.01); *G01C 21/3697* (2013.01); *G06F 3/013* (2013.01); *G06F 3/147* (2013.01); *G06F 3/1431* (2013.01); *G06F 3/1462* (2013.01); *G06T 11/60* (2013.01); *H04N 5/23293* (2013.01); *H04N 5/232941* (2018.08); *H04N 5/247* (2013.01); *H04N 7/183* (2013.01); *B60K 2370/146* (2019.05); *B60K 2370/149* (2019.05); *B60K 2370/152* (2019.05); *B60K 2370/1529* (2019.05); *B60K 2370/182* (2019.05); *B60K 2370/184* (2019.05); *B60K 2370/186* (2019.05); *B60K 2370/193* (2019.05); *B60K 2370/334* (2019.05); *B60K 2370/52* (2019.05); *G06F 3/0482* (2013.01); *G06F 3/04883* (2013.01); *G06T 2200/16* (2013.01); *G06T 2200/24* (2013.01); *G09G 5/14* (2013.01); *G09G 2330/026* (2013.01)

(56) References Cited

U.S. PATENT DOCUMENTS

| | | | |
|---|---|---|---|
| 2009/0037722 A1* | 2/2009 | Chong | G06F 9/441 713/2 |
| 2009/0322714 A1 | 12/2009 | Lee et al. | |
| 2012/0021770 A1 | 1/2012 | Naqvi | |
| 2015/0185843 A1 | 7/2015 | Olien | |
| 2015/0254041 A1 | 9/2015 | Hoshihara et al. | |
| 2015/0339031 A1* | 11/2015 | Zeinstra | G06F 3/04842 715/747 |
| 2015/0371408 A1 | 12/2015 | Schultz et al. | |
| 2016/0200254 A1 | 7/2016 | Raab | |
| 2016/0332574 A1 | 11/2016 | Park et al. | |
| 2017/0253122 A1 | 9/2017 | Jun et al. | |

FOREIGN PATENT DOCUMENTS

| | | |
|---|---|---|
| JP | 2007295048 | 11/2007 |
| JP | 2013205738 | 10/2013 |
| JP | 5341402 | 11/2013 |
| KR | 101286267 | 7/2013 |
| KR | 101730315 | 4/2017 |

OTHER PUBLICATIONS

PCT International Application No. PCT/KR2017/001682, Notification of Transmittal of the International Search Report and the Written Opinion of the International Searching Authority, or Declaration dated May 31, 2017, 13 pages.
European Patent Office Application Serial No. 17763482.1, Search Report dated Aug. 6, 2019, 7 pages.
U.S. Appl. No. 15/448,141, Office Action dated Sep. 20, 2018, 18 pages.
U.S. Appl. No. 15/448,141, Notice of Allowance dated Dec. 28, 2018, 12 pages.

* cited by examiner

[CLUSTER SCREEN(BOOTING COMPLETED)]      [CID SCREEN(BEING BOOTED)]

[CLUSTER SCREEN(BOOTING COMPLETED)]      [CID SCREEN(BEING BOOTED)]

[HUD SCREEN]   [CLUSTER SCREEN]   [CID SCREEN]

[HUD SCREEN]   [CLUSTER SCREEN]   [CID SCREEN]

VEHICLE CONTROL DEVICE MOUNTED IN VEHICLE AND CONTROL METHOD THEREOF

CROSS-REFERENCE TO RELATED APPLICATION

This application is a continuation of U.S. patent application Ser. No. 15/448,141, filed on Mar. 2, 2017, now U.S. Pat. No. 10,286,783, which claims the benefit of earlier filing date and right of priority to Korean Patent Application No. 10-2017-0012738, filed on Jan. 26, 2017, and also claims the benefit of U.S. Provisional Application No. 62/304,900, filed on Mar. 7, 2016, the contents of which are all hereby incorporated reference herein in their entirety.

BACKGROUND OF THE INVENTION

1. Field of the Invention

The present disclosure relates to a vehicle control device provided in a vehicle and a control method thereof.

2. Background of the Invention

A vehicle is an apparatus allowing a user who gets therein to move in a desired direction. Such a vehicle may be typically an automobile, for example. Meanwhile, for convenience of a user who use a vehicle, various sensors and electronic devices are provided. In particular, for driving convenience of a user, research into an advanced driver assistance system (ADAS) has been actively conducted. In addition, development of an autonomous vehicle has been actively made.

Various types of lamps may be provided in a vehicle. In general, a vehicle has various vehicle lamps having a lighting function for allowing a driver to easily check or view an object positioned in the vicinity of the vehicle when driving at night and a signal function for informing another vehicle or a road user about a driving state of the own vehicle.

For example, a vehicle may have a device operated in a manner of directly emitting using a lamp such as a headlight irradiating light to a front side to allow a driver to secure a visual field, a brake light turned on when the driver steps on a brake, a turn signal used when turning to the right or turning to the left.

In another example, a reflector reflecting light allowing the own vehicle to be easily recognized from outside is installed on a front side or a rear side of the vehicle.

An installation reference or standard of the vehicle lamp are defined by regulations to allow each function to be sufficiently exhibited.

Recently, as advanced driving assist system (ADAS) has been actively developed, the necessity to develop a technique capable of maximizing user convenience and safety in driving a vehicle has emerged.

As part thereof, development of technology for various user interfaces and user experiences (UI/UX) between a mobile terminal and a vehicle and development of a technology for autonomous driving and autonomous parking without a driver's operation in a vehicle have been actively made. For example, a vehicle may recognize a parking line through a camera to perform autonomous parking.

Meanwhile, a plurality of displays are disposed in a vehicle to provide information auxiliary to vehicle driving, as well as information essential to vehicle driving.

SUMMARY OF THE INVENTION

Therefore, an aspect of the detailed description is to provide a vehicle control device capable of displaying a high quality seamless image without data transmission delay and a difference in image quality between a plurality of displays, and a method thereof.

Technical tasks obtainable from the present invention are non-limited by the above-mentioned technical task. And, other unmentioned technical tasks can be clearly understood from the following description by those having ordinary skill in the technical field to which the present invention pertains.

To achieve these and other advantages and in accordance with the purpose of this specification, as embodied and broadly described herein, a vehicle control device includes: a plurality of different displays installed in a vehicle; and a controller generating a first image having a plurality of pieces of first information, generating a second image having a plurality of pieces of second information, synthesizing the first and second images, dividing the synthesized image into a plurality of images, and displaying the plurality of divided images on a plurality of displays, respectively.

In an embodiment, the plurality of pieces of information may be vehicle driving information corresponding to a highest priority, and the plurality of pieces of second information may be vehicle driving information having a priority lower than the highest priority.

In an embodiment, the controller may generate a first image having a plurality of separate pieces of first information, generate a second image having a plurality of separate pieces of second information, synthesize the first and second images such that the first information and the second information are matched to each other, divide the synthesized image into a plurality of images on the basis of the matched first and second information, and display the plurality of divided images on the plurality of displays, respectively.

In an embodiment, the plurality of displays may include a cluster, a head-up display (HUD), and a center information display (CID).

In an embodiment, the controller may be a single controller, and the single controller may generate a plurality of independent images to be displayed on the plurality of displays, respectively, divide the plurality of generated independent images, and display the plurality of divided images on the plurality of displays, respectively.

In an embodiment, the controller may generate a first image having a plurality of separate pieces of first information, generate a second image having a plurality of separate pieces of second information, synthesize the first and second images such that the first information and the second information are matched to each other, divide the synthesized image such that the number of the synthesized images and the number of the plurality of displays are equal, on the basis of the matched first and second information, and display the plurality of divided images on the plurality of displays, respectively.

In an embodiment, the controller may display a first image among the divided images on a first display among the plurality of displays, display a second image among the divided images on a second display among the plurality of displays, and display a third image among the divided images on a third display among the plurality of displays.

In an embodiment, each of the first to third images may include any one or more of the plurality of pieces of first information and any one or more of the plurality of pieces of second information.

In an embodiment, each of the first to third images may include one or more of a current vehicle speed, warning information, revolution per minute (RPM), and a vehicle engine temperature, and any one or more of turn-by-turn information, a speed limit, a route from the current location to a destination, point of interest (POI) information, and multimedia data.

In an embodiment, the controller may detect preset required booting times of the plurality of different displays, detect a first display having a fastest required booting time among the preset required booting times, and display an image, which is currently displayed on the booting-completed first display, on a second display being currently booted.

In an embodiment, when the first display, among the plurality of different displays, is completely booted and the second display is being booted, the controller may receive an input for controlling the second display being booted through the booting-completed first display, and when the second display is completely booted, the controller may automatically display result information corresponding to the input on the second display.

In an embodiment, when the first display, among the plurality of different displays, is completely booted and the second display is being booted, the controller may display a menu for controlling the second display being booted in a partial display area of the booting-completed first display, and when a destination is input through the menu, the controller may automatically search for a route from a current location of a vehicle to a destination, and when the second display is completely booted, the controller may automatically display a searched route on the booting-completed second display.

In an embodiment, the controller may display an image generated by a camera of a vehicle on a first display being booted among the plurality of different displays and display the image on a second display or a third display among the plurality of different displays on the basis of a touch drag direction applied to the image and disposition directions of the plurality of different displays.

In an embodiment, the controller may display an image generated by a camera of a vehicle on a first display being booted among the plurality of different displays and display the image on a display disposed in the same direction as a direction of a touch drag applied to the image among the disposition directions of the plurality of different displays.

In an embodiment, when a mobile terminal is connected to the vehicle, the controller may select specific information among the plurality of pieces of first and second information and information of the mobile terminal and control the plurality of different displays such that the selected specific information moves on the plurality of different displays according to driver's eyes.

In an embodiment, the controller may detect the sum of times during which the driver has gazed at the specific information, and when the sum exceeds a reference time, the controller may not display the specific information.

In an embodiment, the controller may detect an estimated reading time of the specific information, and set the estimated reading time as the reference time.

In an embodiment, the controller may extend the reference time on the basis of any one of a user's voice command, a movement of the user's head, and the user's eye gesture.

To achieve these and other advantages and in accordance with the purpose of this specification, as embodied and broadly described herein, a vehicle control method includes: generating a first image having a plurality of pieces of first information, generating a second image having a plurality of pieces of second information, synthesizing the first and second images, dividing the synthesized image into a plurality of images, and displaying the plurality of divided images on a plurality of different displays installed in a vehicle, respectively.

Details of embodiments are included in detailed descriptions and drawings.

The embodiments of the present disclosure have one or more advantages as follows.

First, in the present disclosure, information to be displayed on a head-up display (HUD), a cluster, and a center information display (CID) may be generated as a single image (synthesized image), and the generated single image (synthesized image) is divided to be displayed in the corresponding displays, whereby a high quality seamless image may be displayed on the corresponding images without data transmission delay.

Second, in the present disclosure, information to be displayed on a head-up display (HUD), a cluster, and a center information display (CID) may be generated as a single image (synthesized image), and the generated single image (synthesized image) is divided to be displayed in the corresponding displays, whereby a high quality seamless image may be displayed on the corresponding images without a difference in image quality between the plurality of displays.

Advantages and effects of the present invention that may be obtained in the present invention are not limited to the foregoing effects and any other technical effects not mentioned herein may be easily understood by a person skilled in the art from the present disclosure and accompanying drawings.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
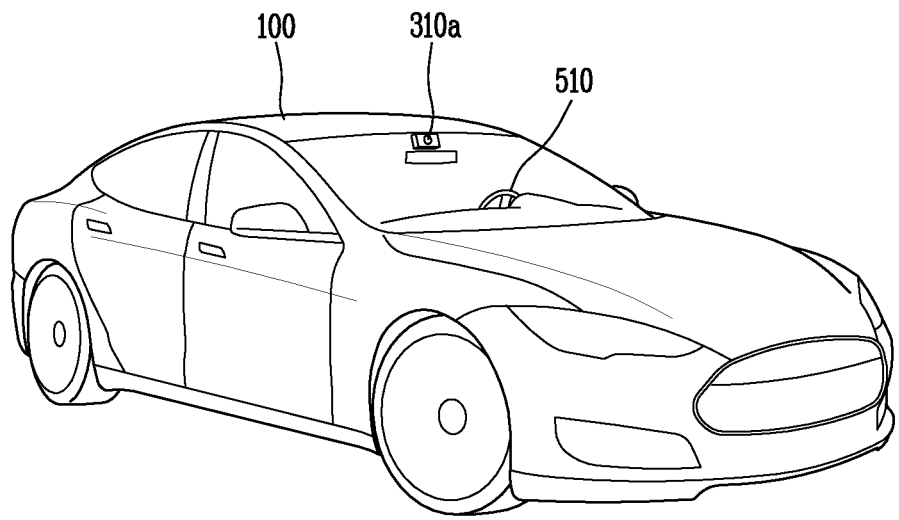
FIG. 1 is a view illustrating appearance of a vehicle in accordance with an embodiment of the present invention.
Figure 1:
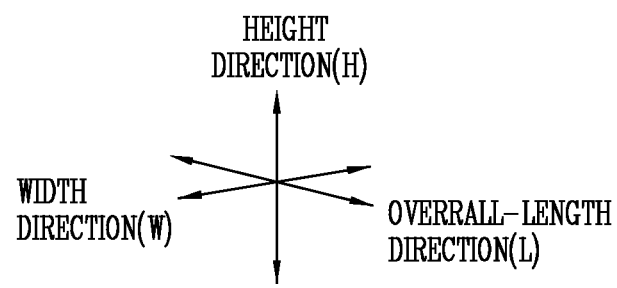

FIG. 1 is a view illustrating appearance of a vehicle in accordance with an embodiment of the present invention.

Figure 2:
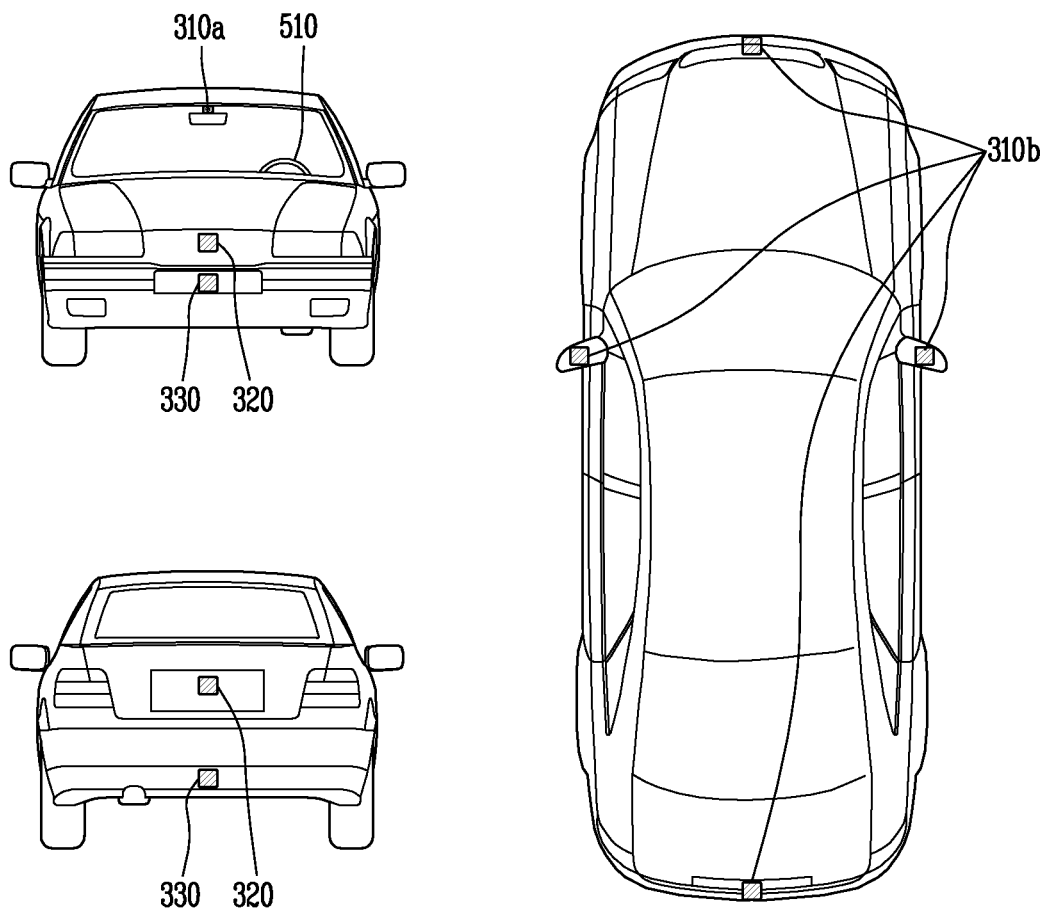
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
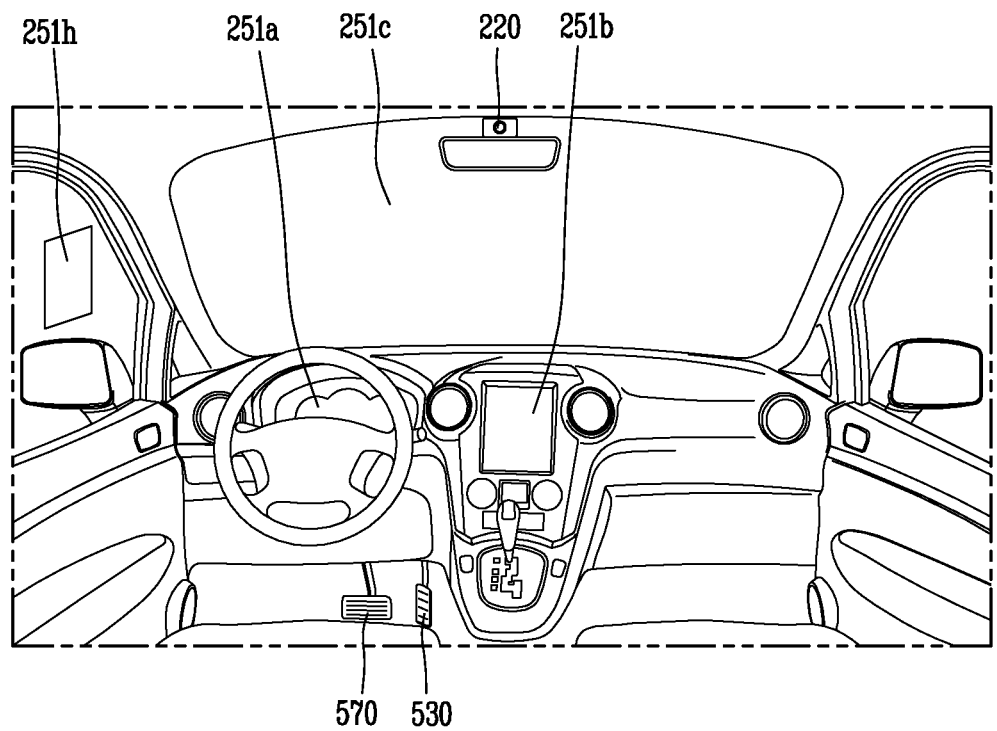
FIGS. 3 and 4 are views illustrating an inside of a vehicle in accordance with an embodiment of the present invention.
Figure 4:
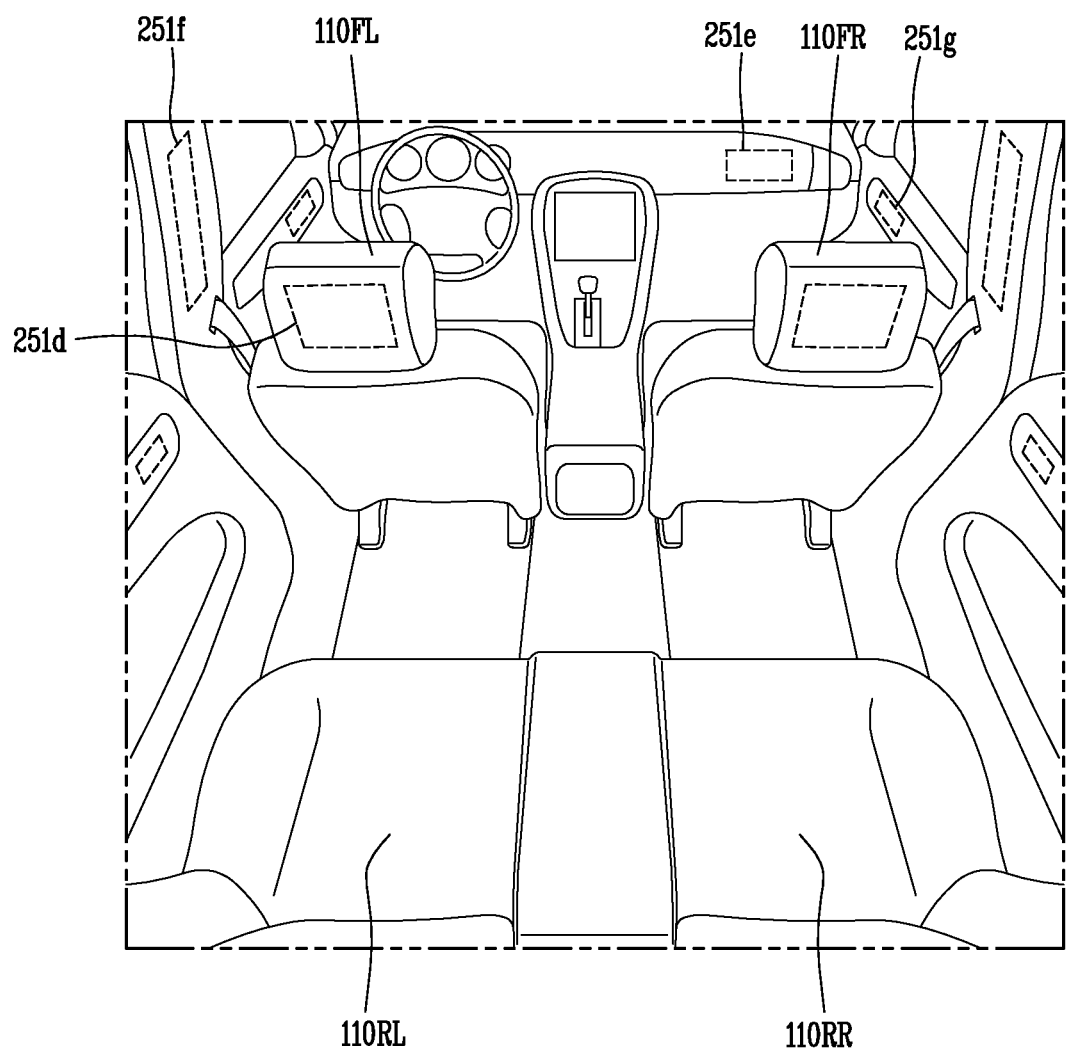

FIGS. 3 and 4 are views illustrating an inside of a vehicle in accordance with an embodiment of the present invention.

Figure 5:
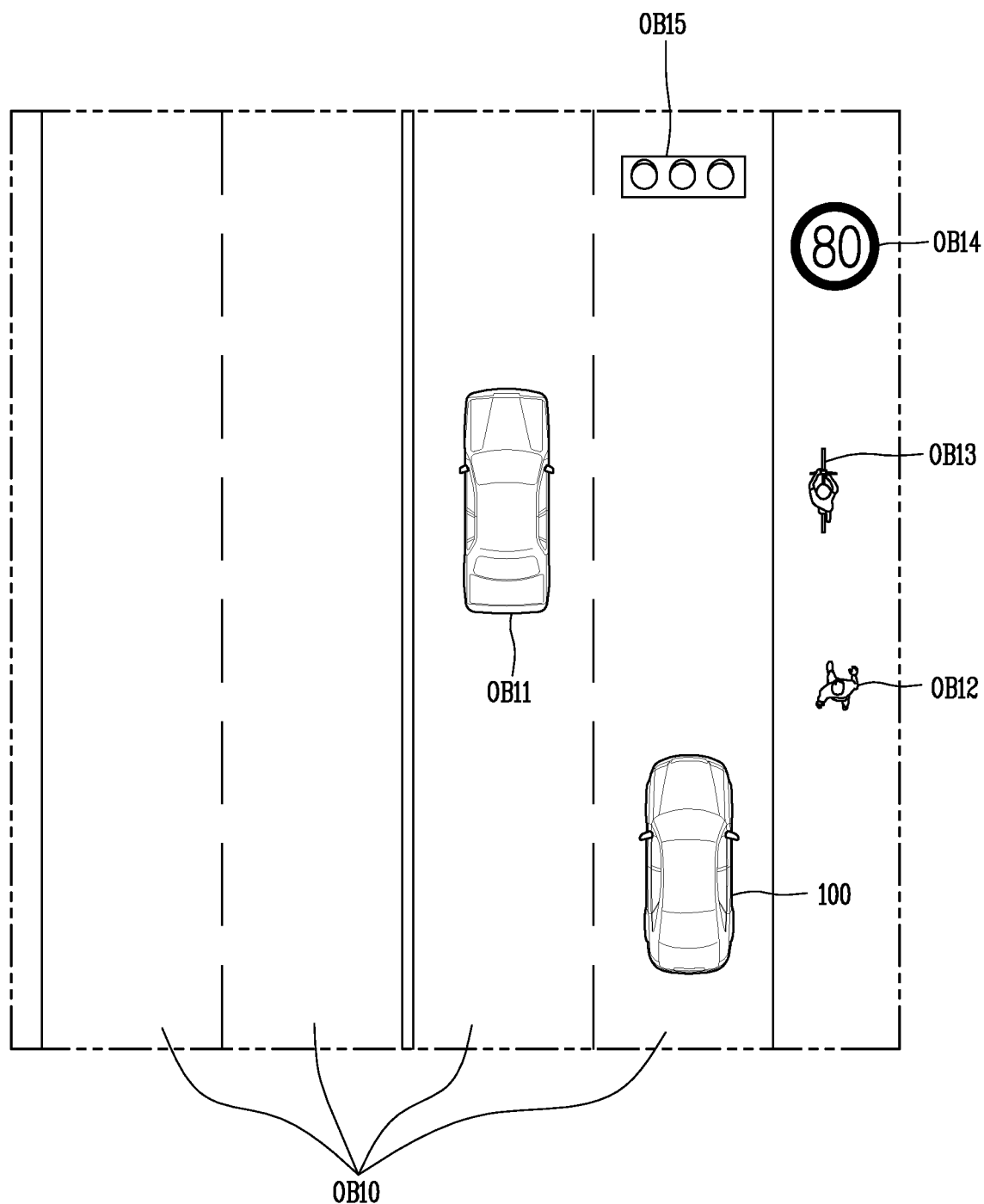
FIGS. 5 and 6 are reference views illustrating objects in accordance with an embodiment of the present invention.
Figure 6:
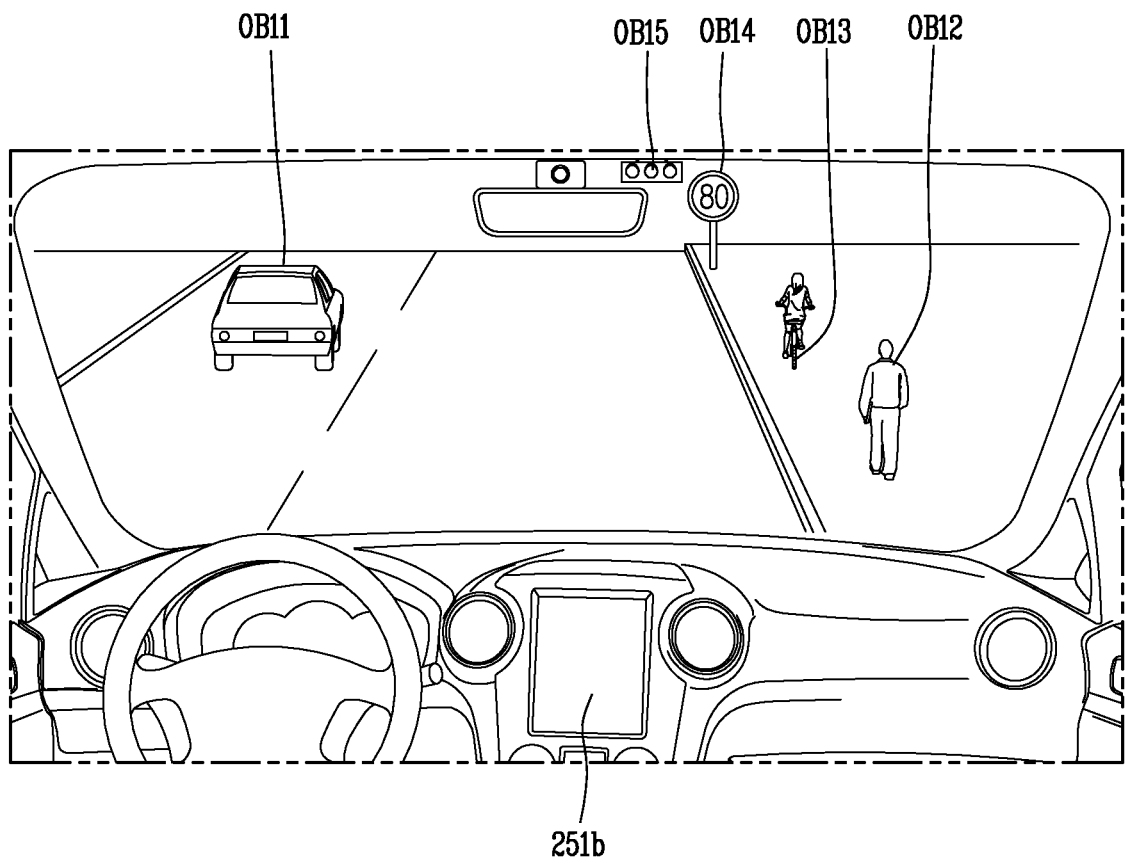

FIGS. 5 and 6 are reference views illustrating objects in accordance with an embodiment of the present invention.

Figure 7:
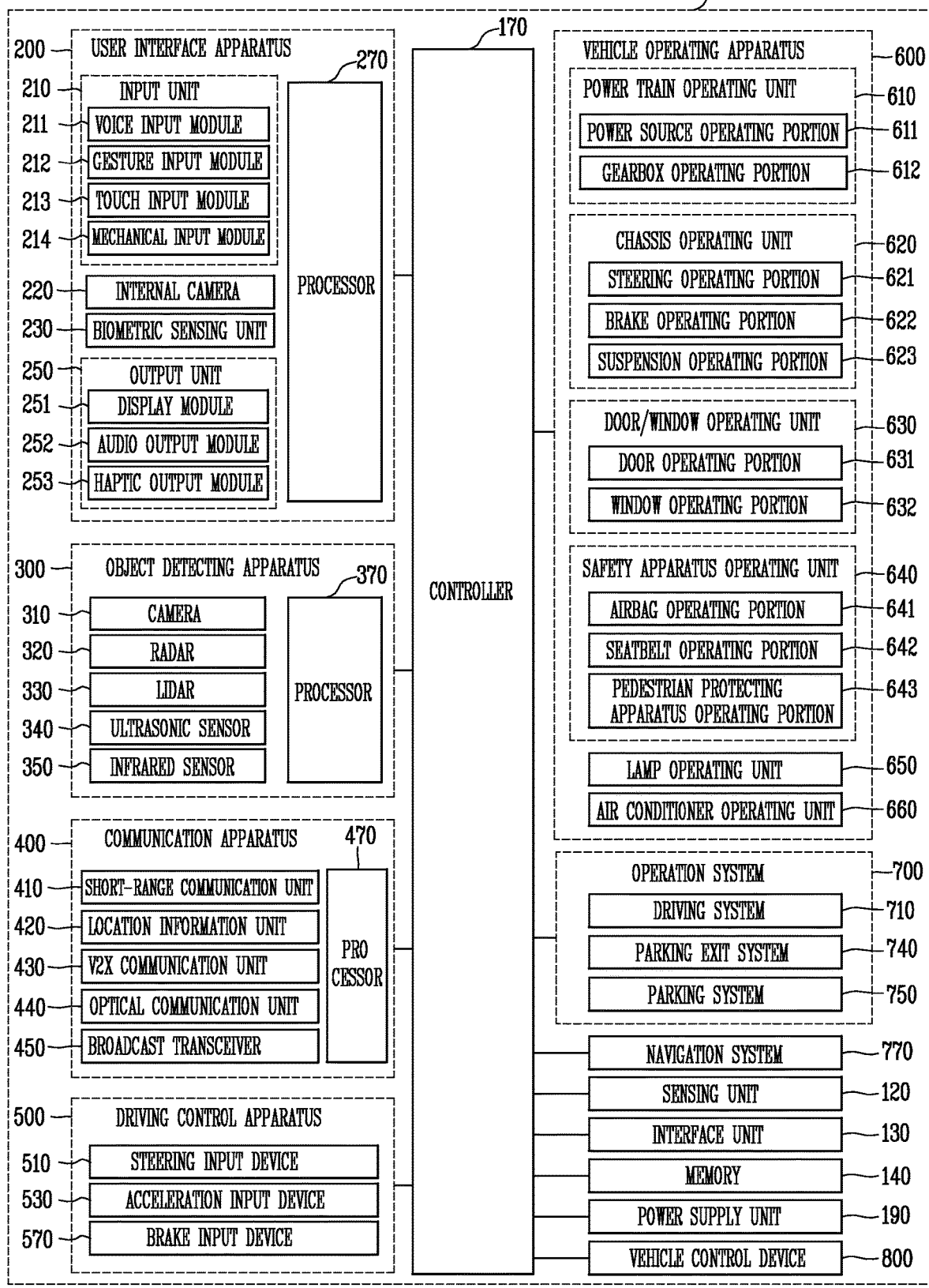
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode (capital driving mode) based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication apparatus 400 may also be referred to as a "wireless communication unit".

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled.

The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 related to the present disclosure may operate in any one of a manual driving mode and an autonomous driving mode. That is, a driving mode of the vehicle 100 may include the manual driving mode and the autonomous driving mode.

The manual driving mode may refer to a mode in which a vehicle is driven according to an operation of a driver. For example, in the manual driving mode, steering of a vehicle is changed according to an operation of a steering wheel by a driver, and a speed of the vehicle may be varied according to an operation of a brake pedal and an acceleration pedal.

The autonomous driving mode (or an automatic driving mode) may refer to a mode in which a vehicle itself drives on the basis of a preset algorithm, regardless of an operation of a driver. For example, the autonomous driving mode may be a mode in which a vehicle may perform driving (operation) by itself in at least one portion of a predetermined section or a section to a destination set by a user.

In the autonomous driving mode, for example, although a driver operates, steering or a speed of a vehicle may not be varied and the vehicle may be driven according to an algorithm previously set to perform autonomous driving.

The manual driving mode and the autonomous driving mode are a known technical field, and thus, a detailed description thereof will be omitted.

Hereinafter, a vehicle control device capable of generating an image having a plurality of pieces of information to be provided to a plurality of displays, dividing the generated image, and providing divided images to the plurality of displays, thus displaying a high quality seamless image without data transmission delay and a difference in image quality between the plurality of displays, and a method thereof will be described.

Figure 8:
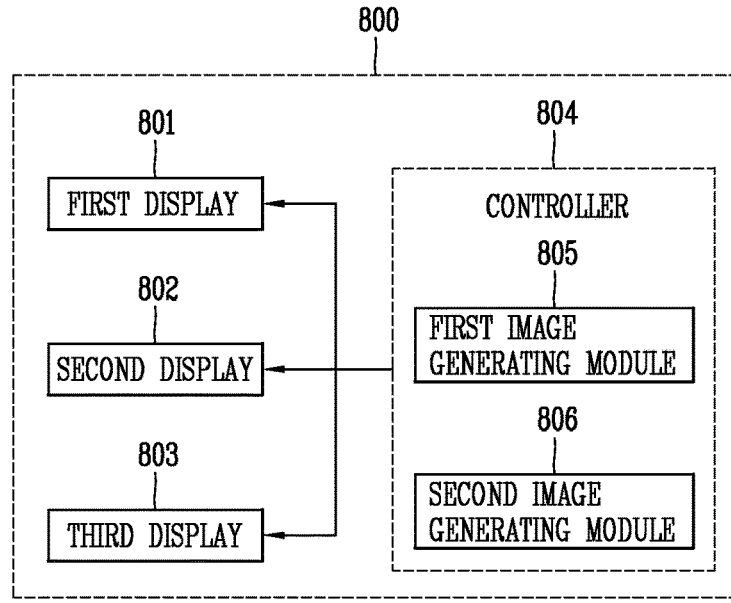
FIG. 8 is a block diagram illustrating a vehicle control device according to an embodiment of the present disclosure.

FIG. 8 is a block diagram illustrating a vehicle control device according to an embodiment of the present disclosure.

A vehicle 100 related to the present disclosure may include a vehicle control device 800.

The vehicle control device 800 may be able to control at least one of the components described above with reference to FIG. 7. From this point of view, the vehicle control device 800 may be the controller 170.

Without being limited thereto, the vehicle control device 800 may be a separate component independent from the controller 170. When the vehicle control device 800 is provided as a component independent form the controller 170, the vehicle control device 800 may be provided in a portion of the vehicle 100.

Hereinafter, for the purposes of description, it is assumed that the vehicle control device 800 is a separate component independent from the controller 170. In this disclosure, functions (operations) of the vehicle control device 800 and a control method thereof may be performed by the controller 170 of the vehicle. That is, every contents described in relation to the vehicle control device 800 may also be inferred and applied to the controller 170 in the same or similar manner.

Also, the vehicle control device 800 described in this disclosure may include some of the components described above with reference to FIG. 7 and various components provided in a vehicle. In this disclosure, for the purposes of description, the components described above with reference to FIG. 7 and various components provided in a vehicle will be given separate names and reference numerals so as to be described.

Hereinafter, components included in the vehicle control device 800 according to an embodiment of the present disclosure will be described in detail.

The vehicle control device 800 related to the present disclosure may include a controller 804, display units 801 to 803, and the like. The controller 805 may be the controller 170 described above with reference to FIG. 7.

The controller 804 may control components described above with reference to FIG. 7 and components described with reference to FIG. 8.

The vehicle control device 800 (or the vehicle 100) and a mobile terminal may be connected to wirelessly communicate with each other through a communication unit. The vehicle control device 800 and the mobile terminal may be wirelessly connected to perform wireless communication each other according to a user request.

The display units 801 to 803 may include at least one of a liquid crystal display (LCD), a thin film transistor-LCD (TFT LCD), an organic light-emitting diode (OLED), a flexible display, a three-dimensional (3D) display, and an e-ink display.

The display units 801 to 803 may be inter-layered or integrated with a touch input unit 213 to implement a touch screen.

The display units 801 to 803 may include a head up display (HUD) 801, a cluster 802, and a center information display (CID) 803 of a vehicle.

The HUD may include a projection module and output information through an image projected to a wind shield or a window of the vehicle.

The wind shield of the vehicle may include a transparent display. The transparent display may be attached to the wind shield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Hereinafter, the vehicle control device 800 capable of generating an image having a plurality of pieces of information to be provided to a plurality of displays, dividing the generated image, and providing divided images to the plurality of displays, thus displaying a high quality seamless image without data transmission delay and a difference in image quality between the plurality of displays, and a method thereof will be described with reference to FIG. 8.

As illustrated in FIG. 8, the vehicle control device 800 according to an embodiment of the present disclosure may include a plurality of different displays 801 to 803 installed in a vehicle, and a controller 804 generating a first image having a plurality of pieces of first information, generating a second image having a plurality of pieces of second information, synthesizing (Merging or combining) the first and second images, dividing the synthesized image into a plurality of images, and displaying the plurality of divided images on the plurality of displays, respectively.

The plurality of displays may include the HUD 801, the cluster 802, and the CID 803.

The controller 804 includes a first image generating module 805 generating a first image having a plurality of pieces of first information and a second image generating module 806 generating a second image having a plurality of pieces of second information.

The controller 804 generates a plurality of pieces of first information as vehicle driving information corresponding to a highest priority, and generates a plurality of pieces of second information as vehicle driving information having a priority lower than the highest priority.

For example, the first image generating module 805 may generate a first image having a highest priority including a current vehicle speed, warning information, revolution per minute (RPM), a vehicle engine temperature, and the like, and the second image generating module 806 generates a second image including turn-by-turn information, a speed limit, a route from the current location to a destination, point of interest (POI) information, multimedia data, and the like. The first image generating module 805 and the second image generating module 806 may independently generate a first image and a second image, respectively.

The controller 804 may change information included in the first image having the highest priority or information included in the second image on the basis of a user's voice command, gesture, touch input, and the like. For example, on the basis of a user's voice command, gesture, touch input, and the like, the controller 804 may move any one or more of the current vehicle speed, warning information, RPM, and vehicle engine temperature included in the first image to the second image or may move any one or more of the turn-by-turn information, speed limit, route from the current location to a destination, POI information, and multimedia data included in the second image to the first image.

The controller 804 generates a first image having a plurality of separate pieces of first information (e.g., the current vehicle speed, warning information, RPM, and vehicle engine temperature, etc.), generates a second image having a plurality of separate pieces of second information (e.g., the turn-by-turn information, speed limit, route from the current location to a destination, POI information, and multimedia data, etc.), synthesizes (Merges or combines) the first and second images such that the first information and the second information are matched to each other, divides the synthesized image into a plurality of images on the basis of the first and second matched information, and displays the plurality of divided images on the plurality of displays 801 to 803, respectively.

The controller 804 is a single controller, and the single controller generates a plurality of independent images to be displayed on the plurality of displays 801 to 803, respectively, dividing the plurality of generated independent images, and displays the plurality of divided images on the plurality of displays 801 to 803, respectively.

The controller 804 generates a first image having a plurality of separate pieces of first information (e.g., the current vehicle speed, warning information, RPM, and vehicle engine temperature, etc.), generates a second image having a plurality of separate pieces of second information (e.g., the turn-by-turn information, speed limit, route from the current location to a destination, POI information, and multimedia data, etc.), synthesizes the first and second images such that the first information and the second information are matched to each other, divides the synthesized image into a plurality of images on the basis of the first and second matched information such that the number of the divided synthesized images is equal to the number of the plurality of displays, and displays the plurality of divided images on the plurality of displays 801 to 803, respectively.

The controller 804 displays a first image among the divided images on a first display among the plurality of displays, displays a second image among the divided images on a second display among the plurality of displays, and displays a third image among the divided images on a third display among the plurality of displays.

For example, the controller 804 generates a first image having a current vehicle speed, warning information, RPM, and vehicle engine temperature, etc., generates a second image having turn-by-turn information, speed limit, route from the current location to a destination, POI information, and multimedia data, etc., synthesizes the first and second images such that the first and second information are matched to each other, divides the synthesized images into three images, displays a first image among the divided images on the HUD, displays a second image among the divided images on the cluster 802, and displays a third image among the divided images on the CID 803.

Each of the first to third images may include any one or more of the plurality of pieces of first information and any one or more of the plurality of pieces of second information. For example, each of the first to third images may include any one or more of the current vehicle speed, warning information (e.g., vehicle collision warning information, road hump warning information, etc.) RPM, and vehicle engine temperature, and any one or more of the turn-by-turn information, speed limit, route from the current location to a destination, POI information, and multimedia data.

That is, the vehicle control device according to an embodiment of the present disclosure generates information to be displayed on the HUD 801, the cluster 802, and the CID 803, as one image (synthesized image), divides the generated one image (synthesized image) and displays the same on the corresponding displays 9 e.g., the HUD 801, the cluster 802, and the CID 803), whereby a high quality seamless image may be displayed on the corresponding displays (e.g., the HUD 801, the cluster 802, and the CID 803) without data transmission delay caused as a plurality of controllers independently controlling a plurality of displays share data.

Also, the vehicle control device according to an embodiment of the present disclosure generates information to be displayed on the HUD 801, the cluster 802, and the CID 803, as one image (synthesized image), divides the generated one image (synthesized image) and displays the same on the corresponding displays 9 e.g., the HUD 801, the cluster 802, and the CID 803), whereby a high quality seamless image may be displayed on the corresponding displays (e.g., the HUD 801, the cluster 802, and the CID 803) without a difference in image quality among a plurality of displays.

Hereinafter, a vehicle control method to generate one image having a plurality of pieces of information to be provided to a plurality of displays, divide the generated one image, and provide the divided images to a plurality of displays, thereby displaying a high quality seamless image without data transmission delay among a plurality of displays and without a difference in image quality among the plurality of displays, will be described with reference to FIG. 9.

Figure 9:
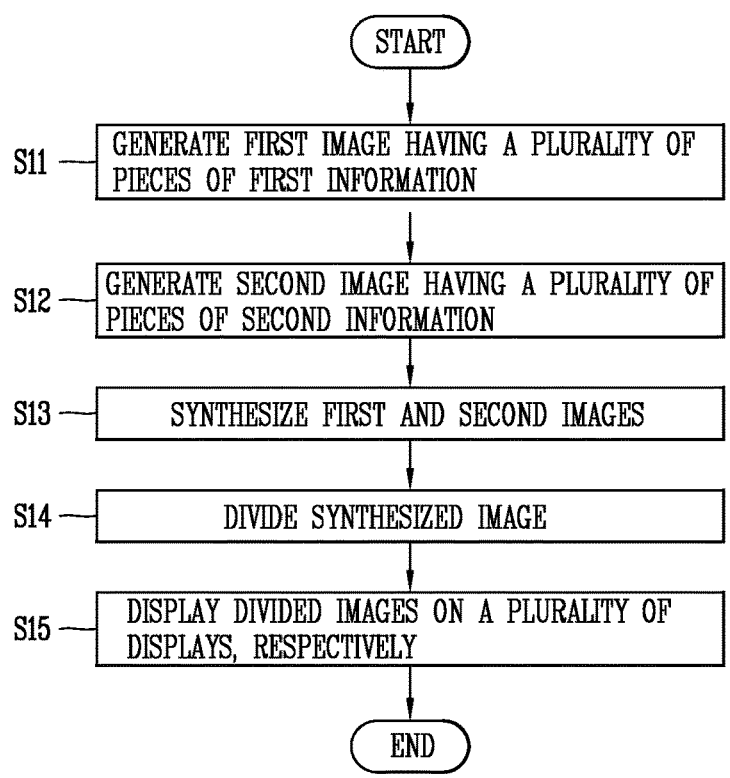
FIG. 9 is a flow chart illustrating a vehicle control method according to an embodiment of the present disclosure.

FIG. 9 is a flow chart illustrating a vehicle control method according to an embodiment of the present disclosure.

First, the controller 804 generates a first image having a plurality of pieces of first information (S11). For example, the controller 804 generates a first image having a highest priority including a current vehicle speed, warning information, RPM, and vehicle engine temperature, etc.

The controller 804 generates a second image having a plurality of pieces of second information (S12). For example, the controller 804 generates a second image including turn-by-turn information, speed limit, route from the current location to a destination, POI information, and multimedia data, etc.

That is, the controller 804 generates a plurality of pieces of first information as vehicle driving information corresponding to the highest priority, and generates a plurality of pieces of second information as vehicle driving information having a priority lower than the highest priority. For example, the first image generating module 805 generates the first image having the highest priority including the current vehicle speed, warning information, RPM, and vehicle engine temperature, etc. and the second image generating module 806 generates the second image including the turn-by-turn information, speed limit, route from the current location to a destination, POI information, and multimedia data, etc. The first I mage generating module 805 and the second image generating module 806 may generate the first image and the second image independently.

On the basis of a user's voice command, gesture, or touch input, the controller 804 may change information included in the first image having the highest priority or change information included in the second image. For example, on the basis of a user's voice command, gesture, or touch input, the controller may move any one or more of the current vehicle speed, warning information, RPM, and vehicle engine temperature, etc. included in the first image to the second image or may move any one or more of the turn-by-turn information, speed limit, route from the current location to a destination, POI information, and multimedia data, etc. included in the second image to the first image.

Hereinafter, the first and second images will be described with reference to FIG. 10.

Figure 10:
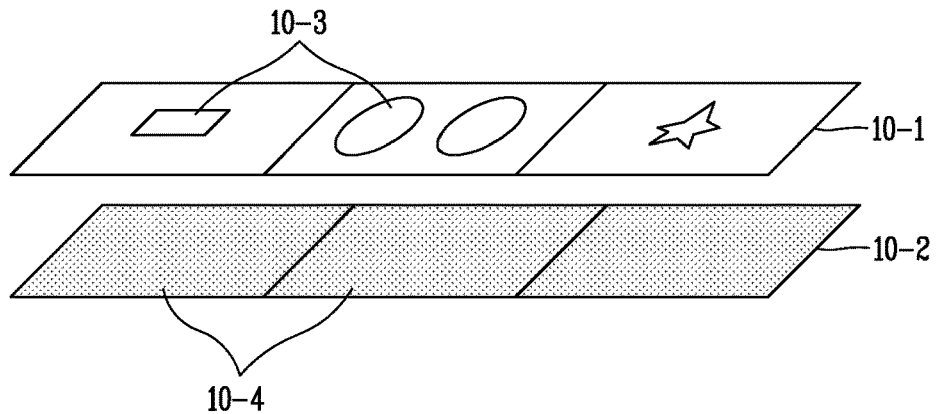
FIG. 10 is a view illustrating an example of first and second images according to an embodiment of the present disclosure.

FIG. 10 is a view illustrating an example of first and second images according to an embodiment of the present disclosure.

As illustrated in FIG. 10, the controller 804 generates a first image 10-1 having a plurality of pieces of first information 10-3 and a second image 10-2 having a plurality of pieces of second information 10-4. For example, the controller 804 generates the first image 10-1 having the highest priority including the current vehicle speed, warning information, RPM, and vehicle engine temperature, etc., and generates the second image 10-2 including the turn-by-turn information, speed limit, route from the current location to a destination, POI information, and multimedia data, etc.

That is, the controller 804 may generate the first image 10-1 having a plurality of separate pieces of first information (e.g., the current vehicle speed, warning information, RPM, and vehicle engine temperature, etc.) 10-3, and generates the second image 10-2 having a plurality of separate pieces of second information (e.g., the turn-by-turn information, speed limit, route from the current location to a destination, POI information, and multimedia data, etc.) 10-4. The plurality of pieces of first information 10-3 may be information essential to vehicle driving and may include current vehicle speed, warning information, RPM, and vehicle engine temperature, etc, and the plurality of pieces of second information 10-4 may be accessorial information to vehicle driving and may include turn-by-turn information, speed limit, route from the current location to a destination, POI information, and multimedia data, etc.

The controller 804 synthesizes the first and second images 10-2 and 10-2 (S13). For example, the controller 804 synthesizes the first and second images 10-1 and 10-2 such that the plurality of separate pieces of first information (e.g., the current vehicle speed, warning information, RPM, and vehicle engine temperature, etc.) 10-3 and the plurality of separate pieces of second information (e.g., the turn-by-turn information, speed limit, route from the current location to a destination, POI information, and multimedia data, etc.) 10-4 are matched to each other.

Hereinafter, the synthesized first and second images will be described with reference to FIG. 11.

Figure 11:
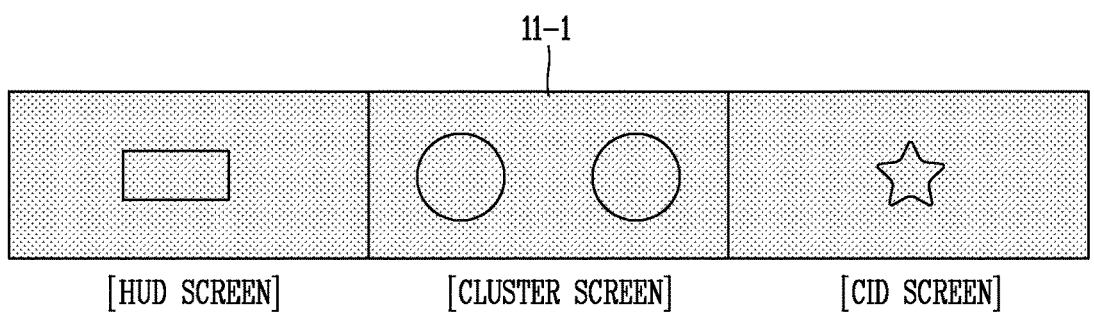
FIG. 11 is a view illustrating an example of a synthesized image according to an embodiment of the present disclosure.

FIG. 11 is a view illustrating an example of a synthesized image 11-1 according to an embodiment of the present disclosure.

As illustrated in FIG. 11, the controller synthesizes the first image 10-1 and the second image 10-2 such that the plurality of separate pieces of first information (e.g., the current vehicle speed, warning information, RPM, and vehicle engine temperature, etc.) 10-3 and the plurality of separate pieces of second information (e.g., the turn-by-turn information, speed limit, route from the current location to a destination, POI information, and multimedia data, etc.) 10-4 are matched to each other.

The controller 804 divides the synthesized image 11-1 (S14) and displays the divided images on a plurality of displays (S15). For example, the controller 804 divides the synthesized image 11-1 (S14), and displays the divided images on a plurality of displays (S15). For example, the controller 804 synthesizes the first and second images such that the plurality of separate pieces of first information (e.g., the current vehicle speed, warning information, RPM, and vehicle engine temperature, etc.) 10-3 and the plurality of separate pieces of second information (e.g., the turn-by-turn information, speed limit, route from the current location to a destination, POI information, and multimedia data, etc.)

10-4 are matched to each other, and divides the synthesized image in to a plurality of images on the basis of the matched first and second information.

Hereinafter, the divided images will be described with reference to FIGS. 12 and 13.

Figure 12:
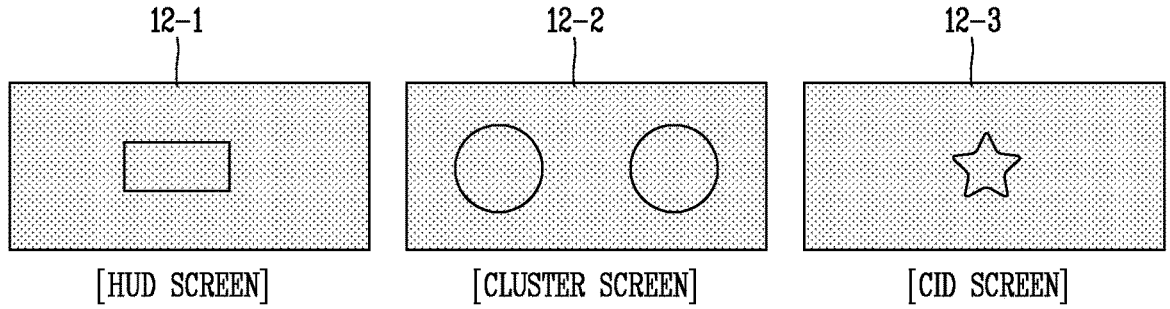
FIG. 12 is a view illustrating an example of divided images according to an embodiment of the present disclosure.

FIG. 12 is a view illustrating an example of divided images according to an embodiment of the present disclosure.

As illustrated in FIG. 12, the controller 804 synthesizes the first image having a plurality of separate pieces of first information (e.g., the current vehicle speed, warning information, RPM, and vehicle engine temperature, etc.) 10-3 and the second image having a plurality of separate pieces of second information (e.g., the turn-by-turn information, speed limit, route from the current location to a destination, POI information, and multimedia data, etc.) 10-4, divide the synthesized image 11-1 into a plurality of images, and displays the plurality of divided images 12-1 to 12-3 on the plurality of displays 801 to 803, respectively.

The controller 804 displays a first image among the divided images on a first display among the plurality of displays, displays a second image among the divided images on a second display among the plurality of displays, and displays a third image among the divided images on a third display among the plurality of displays.

For example, the controller 804 divides the synthesized image 11-1 into first to third images 12-1 to 12-3, and displays a first image 12-1 among the divided images 12-1 to 12-3 on the HUD 801, a second image 12-2 among the divided images on the cluster 802, and a third image 12-3 among the divided images on the CID 803.

Each of the first to third images may include any one or more of the plurality of pieces of first information and any one or more of the plurality of pieces of second information. For example, each of the first to third images may include any one or more of the current vehicle speed, warning information (e.g., vehicle collision warning information, road hump warning information, etc.) RPM, and vehicle engine temperature, and any one or more of the turn-by-turn information, speed limit, route from the current location to a destination, POI information, and multimedia data.

Figure 13:
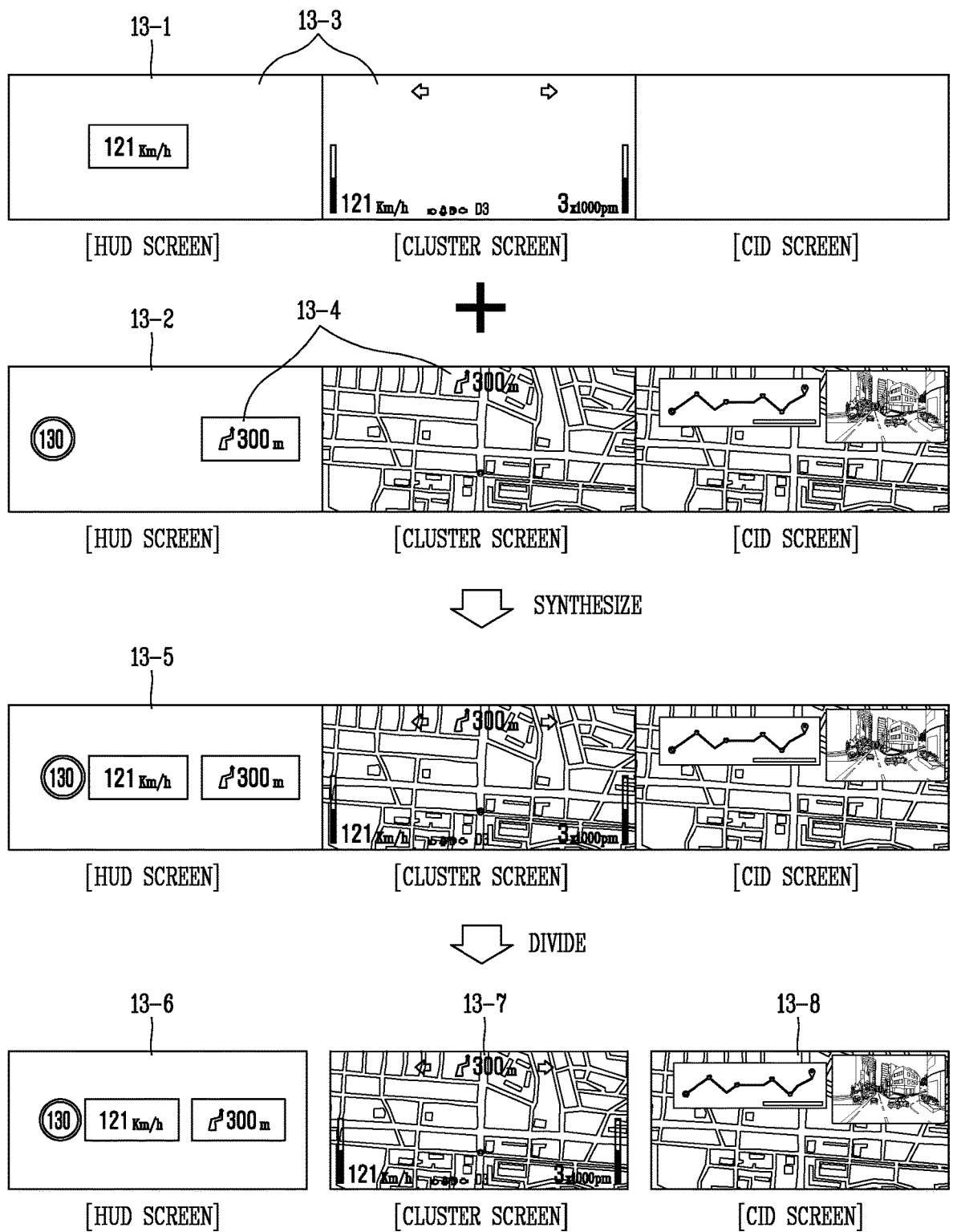
FIG. 13 is a view illustrating another example of divided images according to an embodiment of the present disclosure.

FIG. 13 is a view illustrating another example of divided images according to an embodiment of the present disclosure.

As illustrated in FIG. 13, the controller 804 synthesizes a first image 13-1 having a plurality of separate pieces of first information (e.g., the current vehicle speed, warning information, RPM, and vehicle engine temperature, etc.) 13-3 and a second image 13-2 having a plurality of separate pieces of second information (e.g., the turn-by-turn information, speed limit, route from the current location to a destination, POI information, and multimedia data, etc.) 13-4, divides the synthesized image 13-5 into a plurality of images, and displays the plurality of divided images on the plurality of displays 801 to 803, respectively.

For example, the controller 804 divides a synthesized image 13-5 into a plurality of first to third images 13-6 to 13-8, and displays a first image 13-6 among the divided images 13-6 to 13-8 on the HUD 801, displays a second image 13-7 among the divided images on the cluster 802, and displays a third image 13-8 among the divided images on the CID 803.

That is, the vehicle control device according to an embodiment of the present disclosure generates information to be displayed on the HUD 801, the cluster 802, and the CID 803, as one image (synthesized image), divides the generated one image (synthesized image) and displays the same on the corresponding displays 9 e.g., the HUD 801, the cluster 802, and the CID 803), whereby a high quality seamless image may be displayed on the corresponding displays (e.g., the HUD 801, the cluster 802, and the CID 803) without data transmission delay caused as a plurality of controllers independently controlling a plurality of displays share data.

Also, the vehicle control device according to an embodiment of the present disclosure generates information to be displayed on the HUD 801, the cluster 802, and the CID 803, as one image (synthesized image), divides the generated one image (synthesized image) and displays the same on the corresponding displays 9 e.g., the HUD 801, the cluster 802, and the CID 803), whereby a high quality seamless image may be displayed on the corresponding displays (e.g., the HUD 801, the cluster 802, and the CID 803) without a difference in image quality among a plurality of displays.

Figure 14:
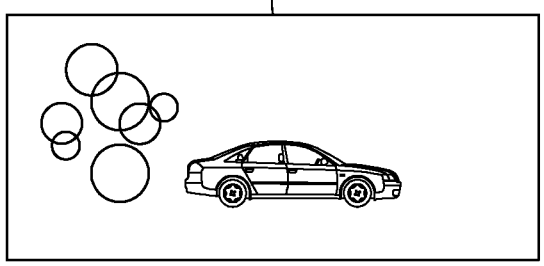
FIGS. 14 and 15 are views illustrating an example of images according to another embodiment of the present disclosure.
Figure 14:
Figure 15:
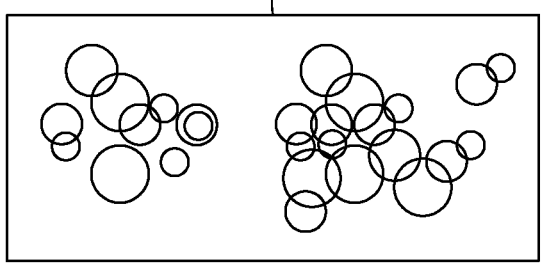
Figure 15:
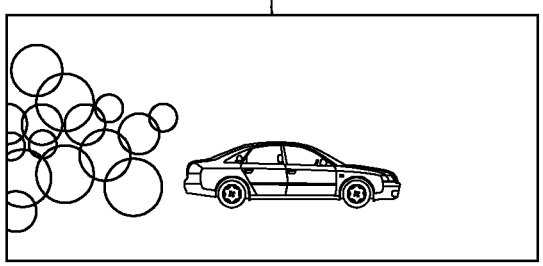

FIGS. 14 and 15 are views illustrating an example of images according to another embodiment of the present disclosure.

As illustrated in FIG. 14, when a plurality of different displays (e.g., the HUD 801, the cluster 802, and the CID 8030 are booted, times required for booting the plurality of different displays are different. For example, it is assumed that a time required for booting the cluster 802 is faster than a time required for booting the CID 803. In this case, since the cluster 802 displays an initial image 14-1 after being completely booted, the CID 803 is being booted, and thus, the cluster 802 and the CID 803 display initial images at different times.

As illustrated in FIG. 15, the controller 804 detects preset required booting times of a plurality of different displays (e.g., the HUD 801, the cluster 802, and the CID 803), detects a display (e.g., the cluster) having the fastest required booting time among the preset required booting times), and displays an image 15-1, which is currently displayed on the detected display (e.g., the cluster) 14-1 after being completely booted, as an initial image 15-2 on a display (e.g., the CID 803) being currently booted.

The controller 804 may display video having a play time different from video (e.g., an animation, etc.), which is currently displayed on the booting-completed display (e.g., the cluster), on a display (e.g., the CID 803) being currently booted.

Hereinafter, a vehicle control device which receives a user input for controlling a display (e.g., the CID 803) being booted through a booting-completed display (e.g., the cluster), and automatically providing result information corresponding to the user input when booting of the display (e.g., the CID 803) is completed, and a method thereof will be described with reference to FIG. 16.

Figure 16:
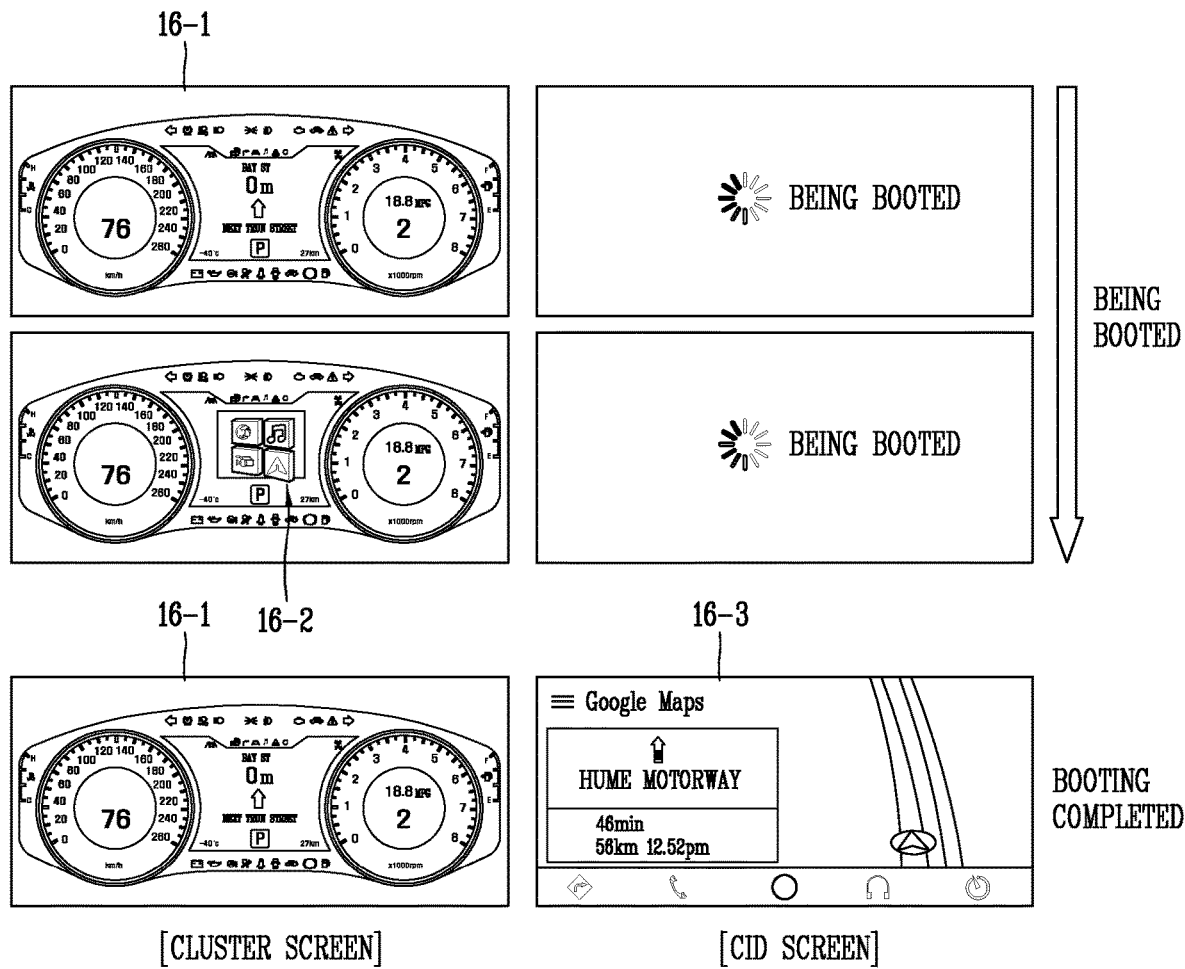
FIG. 16 is a view illustrating an example of images according to another embodiment of the present disclosure.

FIG. 16 is a view illustrating an example of images according to another embodiment of the present disclosure.

As illustrated in FIG. 16, when the first display (e.g., the cluster 801), among the plurality of different displays, is completely booted and the second display (e.g., the CID 803) is being booted, the controller 804 receives an input for controlling the second display (e.g., the CID 803) being booted through the booting-completed first display (e.g., the cluster 801) and automatically displays result information corresponding to the input on the second display (e.g., the CID 803 when the second display is completely booted.

For example, when the first display (e.g., the cluster 801), among the plurality of different displays (e.g., the HUD 801, the cluster 802, and the CID 803), is completely booted, the controller 804 displays an initial image 16-1 on the booting-completed first display (e.g., the cluster 801).

When the first display (e.g., the cluster 801), among the plurality of different displays (e.g., the HUD 801, the cluster 802, and the CID 803), is completely booted and the second display (e.g., the CID 803) is being booted, the controller 804 displays a main menu 16-2 of the second display (e.g., the CID 803) being booted on a partial display area of the booting-completed first display (e.g., the cluster 801). The main menu 16-2 may be previously stored in the memory 140.

The main menu 16-2 may include a menu for searching for a destination, a menu for searching for multimedia data, and the like.

When a destination is input through the main menu 16-2 displayed in the partial display area of the booting-completed first display (e.g., the cluster 801), the controller 804 automatically searches for a route from the current location of the vehicle to the destination.

When booting of the second display (e.g., the CID 803) is completed, the controller 804 automatically displays an automatically searched route 16-2 on the booting-completed second display (e.g., the CID 803).

Hereinafter, a vehicle control device which displays a rear image of a vehicle on a display (e.g., the CID 803) when the display (e.g., the CID 803) is being booted, and a method thereof will be described with reference to FIGS. 17 and 18.

Figure 17:
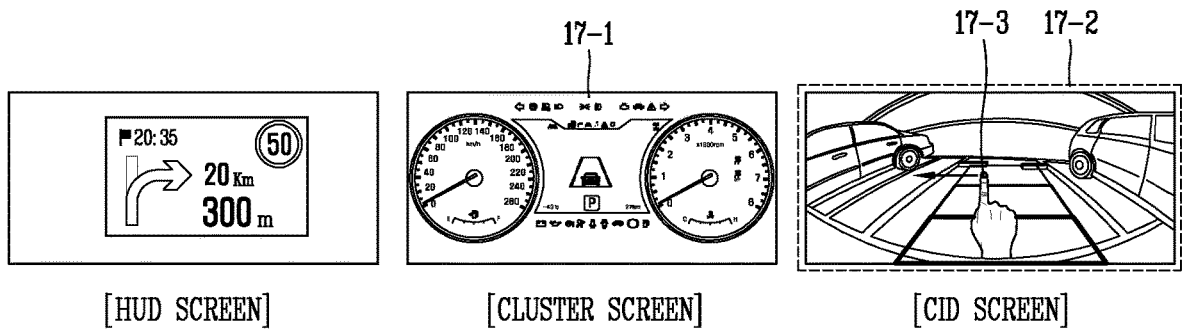
FIGS. 17 and 18 are views illustrating an example of images according to another embodiment of the present disclosure.
Figure 18:
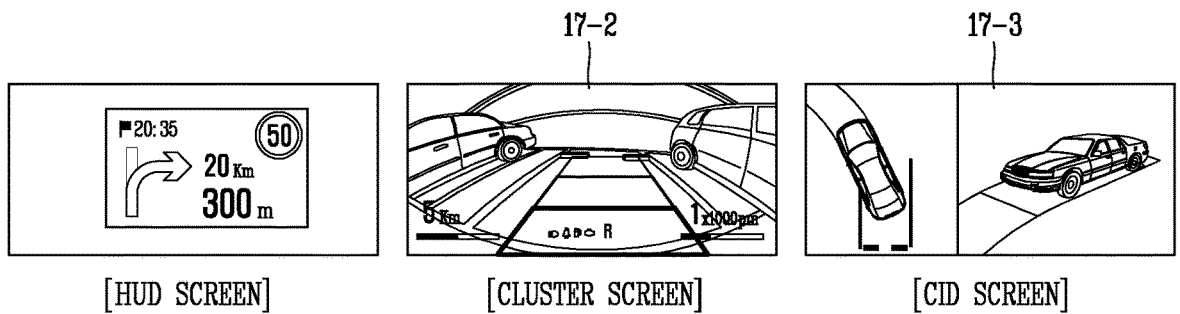

FIGS. 17 and 18 are views illustrating an example of images according to another embodiment of the present disclosure.

As illustrated in FIG. 17, when it is assumed that the HUD 801 and the cluster 802 are completely booted and the CID 803 is being booted, the controller 804 displays an image indicating turn-by-turn information, a speed limit, and the like, on the booting-completed HUD 801, displays an image 17-1 including the current vehicle speed, a vehicle RPM, a vehicle engine temperature, a coolant temperature, an amount of fuel, and the like, on the booting-completed cluster 802, and displays a rear image 17-2 of a vehicle on the display (e.g., the CID 803) being booted.

As illustrated in FIG. 18, on the basis of a user touch input 17-3 applied to the rear image 17-2 of the vehicle displayed on the display (e.g., the CID 803) being booted, the controller 804 displays the rear image 17-2 captured by a rear camera of the vehicle on the HUD 801 or the cluster 802.

On the basis of disposition directions of the HUD 801, the cluster 802, and the CID 803 and a user's touch drag direction 17-3 applied to the rear image 17-2 of the vehicle displayed on the display (e.g., the CID 803) being booted, the controller 804 displays the rear image 1702 of the vehicle being displayed on the display (e.g., the CID 803) being booted, on the HUD 801 or on the cluster 802. For example, the controller 804 displays a display (e.g., the cluster 802) disposed in the same direction as the user's touch drag direction 17-3 applied to the rear image 17-2 displayed on the display (e.g., the CID 803) being booted, among the disposition directions of the HUD 801, the cluster 802, and the CID 803.

When the rear image 17-2 of the vehicle is moved from the CID 803 to the cluster 802 and booting of the CID 803 is completed, the controller 804 displays the generated image 17-3 on the CID 803.

Hereinafter, a vehicle control device which moves specific information (e.g., important information) among pieces of information (objects) displayed on a plurality of displays, from a plurality of display screens according to driver's eyes, and a method thereof will be described with reference to FIG. 19.

Figure 19:
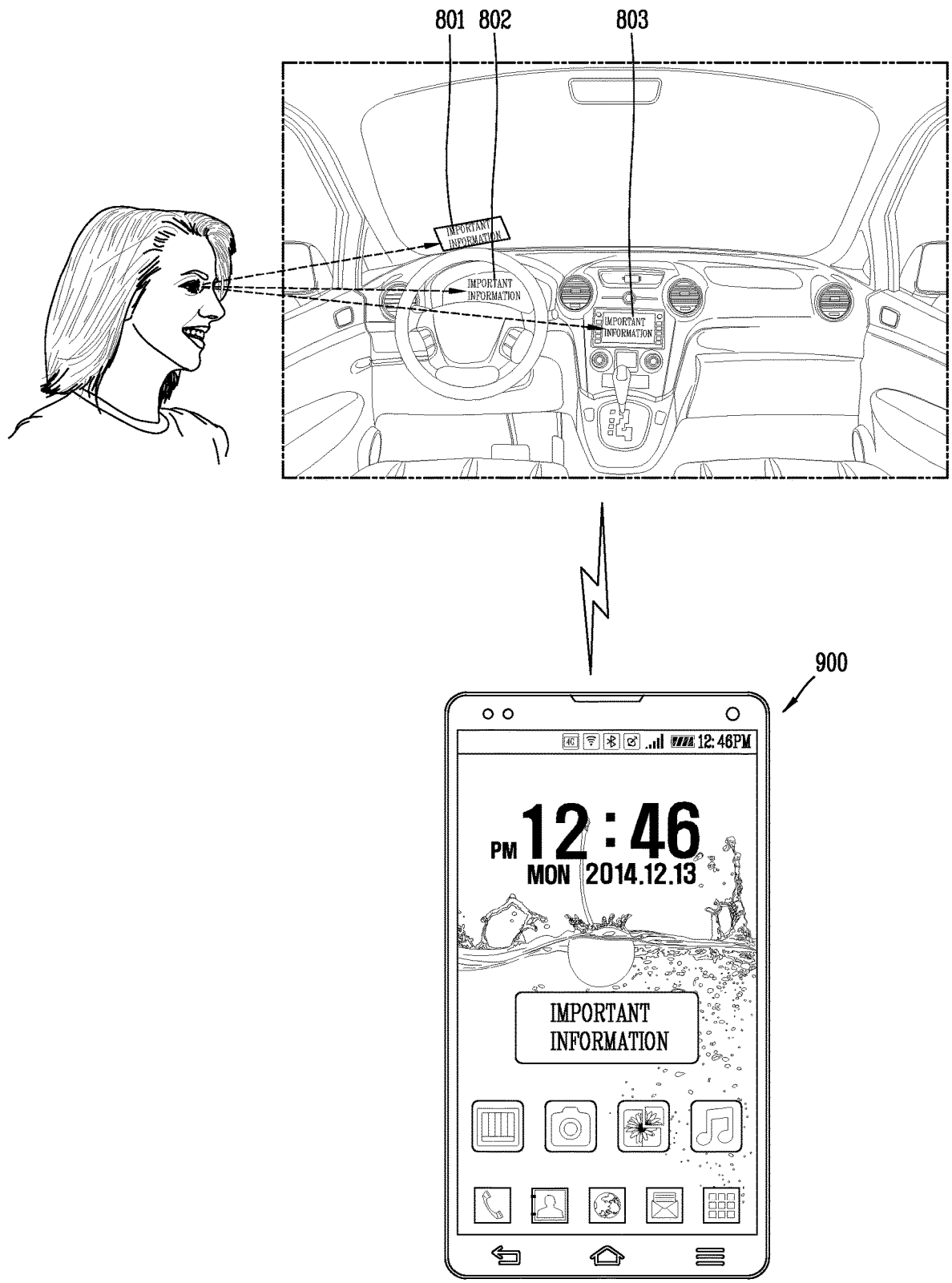
FIG. 19 is a view illustrating a vehicle control device according to another embodiment of the present disclosure.

FIG. 19 is a view illustrating a vehicle control device according to another embodiment of the present disclosure.

As illustrated in FIG. 19, when a smartphone (mobile terminal) is connected to a vehicle, the controller 804 determines (selects) important information among information of the mobile terminal and a plurality of pieces of information 10-3 and 10-4 according to a vehicle stop state, and controls the plurality of displays 801, 802, and 803 such that the important information is moved on the plurality of display screens according to the driver's eyes. The important information may be turn-by-turn information, vehicle collision estimation information, a call signal previously set in the mobile terminal (smartphone), and the like.

For example, when a driver gazes at the HUD 801 when important information is generated in the mobile terminal (smartphone), the controller 804 displays the important information on the HUD 801, and when the driver gazes at the CID 803 within a reference time (e.g., one minute), the controller 804 displays the important information on the CID 803, and when the driver gazes at the cluster 802 within the reference time, the controller 804 displays the important information on the cluster 802.

After a total time during which the driver has gazed at the important information exceeds the reference time, when the driver gazes at the HUD again, the controller 804 may not display the important information on the HUD and may display turn-by-turn information, or the like, on the HUD 801.

The controller 804 detects the sum of the gaze time regarding the important information, and when the sum exceeds the reference time (e.g., one minute), the controller 804 does not display the important information.

The controller 804 may change the reference time according to a user setting, or may change the reference time (e.g., one minute) proportionally according to a reading time of the important information. For example, the controller 804 may detect an estimated reading time of the important information and set the estimated reading time as the reference time (e.g., one minute).

When the mobile terminal (smartphone) is connected to a vehicle, the controller 804 may change priority levels of information of the mobile terminal (smartphone) and information of a vehicle terminal (the plurality of pieces of information 10-3 and 10-4) in order close to the driver according to a vehicle driving state or a stop state, and display the information of the mobile terminal (smartphone) and the information of the vehicle terminal (the plurality of pieces of information 10-3 and 10-4) on the plurality of displays 801 to 803 according to the changed priority levels. For example, in a state in which a rear image of the vehicle is currently displayed on the cluster 802, when turn-by-turn information having a higher priority is to be displayed on the cluster 802, the controller 804 may display the turn-by-turn information on the cluster 802 and display the rear image of the vehicle on the CID 803.

In a state in which the turn-by-turn information is displayed on the HUD 801, the rear image of the vehicle is displayed on the cluster 802, and navigation information is displayed on the CID 803, when an important call/message having higher priority is received, the controller 804 may show call/message on the HUD 801 and displays the turn-by-turn information on another display (e.g., the cluster).

The controller 804 may set the estimated reading time as the reference time (e.g., one minute) or may extend the reference time.

For example, when the driver wants to view important information for a longer time, that is, when a voice command ("extend") is received in a state in which the driver gazes at the important information, the controller 804 may extend the reference time. Also, the controller 804 may extend the reference time by a preset time (e.g., one minute) whenever the voice command ("extend") is received in a state in which the driver gazes at the important information as the driver wants to view the important information for a longer time.

When the driver wants to view the important information for a longer time, that is, when the driver moves his or her head (e.g., the driver tilts his or her head to the left or right) in a state in which the driver gazes at the important information, the controller 804 may extend the reference time. The controller 804 may extend the reference time by a preset time (e.g., one minute) whenever a movement of the driver's head is repeated in a state in which the driver gazes at the important information.

When the driver wants to view the important information for a longer time, that is, when an eye gesture is input in a state in which the driver gazes at the important information, the controller 804 may extend the reference time (e.g., one minute is extended whenever the driver gives a wink. When the driver gives two winks, two minutes are extended).

When the driver does not wants to view the important information any longer, that is, when the driver inputs a voice command ("delete") or a head (the driver turns his or her head from side to side) or eye gesture (the driver blinks his or her eyes once) is input in a state in which the driver gazes at the important information, the controller 804 may immediately delete the important information.

When the driver wants to fixedly display the important information only a desired display (e.g., the cluster) among the plurality of displays 801 to 803, that is, when a voice command ("fix") or a head gesture (e.g., the driver nods his or her head once) is input after the driver's eyes and head turn to the cluster 802 in a state in which the driver gazes at the important information displayed on the CID 803, the controller 803 may fix the important information to the cluster 802, whereby the driver may easily and rapidly move desired information (e.g., important information) to a desired display (e.g., from the CID 803 to the cluster 802), during driving.

Advantages and effects of the present invention that may be obtained in the present invention are not limited to the foregoing effects and any other technical effects not mentioned herein may be easily understood by a person skilled in the art from the present disclosure and accompanying drawings.

The vehicle control device 800 described above may be included in the vehicle 100.

Also, an operation or control method of the vehicle control device 800 described above may be inferred and applied in the same/similar manner as an operation or a control method of the vehicle 100 (or the controller 170).

Also, every function, configuration, or control method performed by the vehicle control device 800 described above may be performed by the controller 170 provided in the vehicle 100. That is, every control method described in this disclosure may also be applied to a control method of a vehicle and a control method of a control device.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A display apparatus, comprising:
    a plurality of displays located in a vehicle; and
    a controller configured to receive an input for controlling a first display, among the plurality of displays, wherein the input is received when the first display is currently being booted and the input is received through a second display that has completed booting; and
    cause the first display to display information corresponding to the input when the first display has completed booting,
    wherein the input for controlling the first display is received from the second display when the first display is currently being booted.

2. The display apparatus of claim 1, wherein the controller is further configured to:
    cause the first display, among the plurality of displays, to display a menu at a partial display area of the first display, wherein the menu is for controlling the second display among the plurality of displays, wherein the menu is displayed when the second display is currently being booted and the first display has completed booting;
    search for a route from a current location of the vehicle to a destination when a destination is input through the menu; and
    cause the second display to display a route when the second display has been completed booting and when the destination has been input.

3. The display apparatus of claim 1, wherein the controller is further configured to:
    identify required booting times of the plurality of displays;

identify the first display, from among the plurality of displays, as having a fastest required booting time among the required booting times;

cause the first display, after completion of booting, to display an image; and cause the second display, among the plurality of displays, to display the image after the completion of the booting of the first display and while the second display is being currently booted.

4. The display apparatus of claim 1, wherein the controller is further configured to:

cause the first display, among the plurality of displays, to display an image received from a camera located at the vehicle, wherein the image is displayed on the first display;

cause the second display, among the plurality of displays, to display the image when a direction of a touch drag input received at the first display is toward a location of the second display; and cause a third display, among the plurality of displays, to display the image when a direction of a touch drag input received at the first display is toward a location of the third display.

5. The display apparatus of claim 1, wherein the controller is further configured to:

select specific information from among a plurality of items of first information and a plurality of items of second information when a mobile terminal is connected to the vehicle; and cause displaying of the specific information on any of the plurality of displays according to movement of a user's eyes.

6. The display apparatus of claim 5, wherein the controller is further configured to:

identify a number of times that the user's eyes are directed toward the displayed specific information; and terminate the displaying of the specific information when the number of times exceeds a threshold value.

7. The display apparatus of claim 6, wherein the controller is further configured to:

identify an estimated time for reading the specific information by the user; and set the estimated time as the threshold value.

8. The display apparatus of claim 6, wherein the controller is further configured to:

change the threshold value according to any of a user's voice command, a movement of the user's head, or the user's eye gesture.

9. The display apparatus of claim 1, wherein the controller is further configured to:

generate a first image having a plurality of items of first information which are separate items of information;

generate a second image having a plurality of items of second information which are separate items of information;

combine the first image and the second image to form a third image by matching each of the separate items of information of the first information with a respective item of the separate items of information of the second information;

divide the third image into a first plurality of images according to the matched separate items of information; and cause the plurality of displays to respectively display one of the first plurality of images according to the matched separate items of information.

10. The display apparatus of claim 9, wherein the number of the first plurality of images of the third image is equal to the number of the plurality of displays.

11. A method for a display apparatus, the method comprising:

receiving an input for controlling a first display, among a plurality of displays, wherein the input is received when the first display is currently being booted and the input is received through a second display that has completed booting; and displaying, on the first display, information corresponding to the input when the first display has completed booting, wherein the input for controlling the first display is received from the second display when the first display is currently being booted.

12. The method of claim 11, further comprising:

displaying, on the first display among the plurality of displays, a menu at a partial display area of the first display, wherein the menu is for controlling the second display among the plurality of displays, wherein the menu is displayed when the second display is currently being booted and the first display has completed booting;

searching for a route from a current location of the vehicle to a destination when a destination is input through the menu; and displaying, on the second display, a route when the second display has been completed booting and when the destination has been input.

13. The method of claim 11, further comprising:

identifying required booting times of the plurality of displays;

identifying the first display, from among the plurality of displays, as having a fastest required booting time among the required booting times;

displaying, on the first display, an image after completion of booting; and displaying, of the second display among the plurality of displays, the image after the completion of the booting of the first display and while the second display is being currently booted.

14. The method of claim 11, further comprising:

displaying, on the first display among the plurality of displays, an image received from a camera located at the vehicle, wherein the image is displayed on the first display;

displaying, on the second display, among the plurality of displays, the image when a direction of a touch drag input received at the first display is toward a location of the second display; and displaying, on a third display, among the plurality of displays, the image when a direction of a touch drag input received at the first display is toward a location of the third display.

15. The method of claim 11, further comprising:

selecting specific information among the plurality of items of the first information and the plurality of items of the second information when a mobile terminal is connected to the vehicle; and displaying the specific information on any of the plurality of displays according to movement of a user's eyes.

16. The method of claim 15, further comprising:

identifying a number of times that the user's eyes are directed toward the displayed specific information; and terminating the displaying of the specific information when the number of times exceeds a threshold value.

17. The method of claim 16, further comprising:
identifying an estimated time for reading the specific information by the user; and
setting the estimated time as the threshold value.

18. The method of claim 16, further comprising:
changing the threshold value according to any of a user's voice command, a movement of the user's head, or the user's eye gesture.

19. The method of claim 11, further comprising:
generating a first image having a plurality of items of first information which are separate items of information;
generating a second image having a plurality of items of second information which are separate items of information;
combining the first image and the second image to form a third image by matching each of the separate items of information of the first information with a respective item of the separate items of information of the second information;
dividing the third image into a first plurality of images according to the matched separate items of information; and
respectively displaying, on the plurality of displays, one of the first plurality of images according to the matched separate items of information.

20. The method of claim 19, wherein the number of the first plurality of images of the third image is equal to the number of the plurality of displays.

* * * * *